(12) United States Patent
Niu

(10) Patent No.: US 6,961,327 B2
(45) Date of Patent: Nov. 1, 2005

(54) TCP AWARE LOCAL RETRANSMISSIONER SCHEME FOR UNRELIABLE TRANSMISSION NETWORK

(75) Inventor: Zhisheng Niu, Beijing (CN)

(73) Assignee: Fujitsu Limited, Kawasaki (JP)

( * ) Notice: Subject to any disclaimer, the term of this patent is extended or adjusted under 35 U.S.C. 154(b) by 835 days.

(21) Appl. No.: 09/931,656

(22) Filed: Aug. 16, 2001

(65) Prior Publication Data

US 2003/0035420 A1 Feb. 20, 2003

(30) Foreign Application Priority Data

Aug. 18, 2000 (CN) .............................. 00123517 A

(51) Int. Cl.[7] .............................................. H04Q 7/24
(52) U.S. Cl. ...................... 370/338; 370/465; 370/352; 370/474
(58) Field of Search ................................. 370/229, 230, 370/230.1, 231, 232, 233, 234, 235, 252, 370/253, 338, 352, 353, 354, 389, 394, 395.52, 370/519, 465, 469, 474, 476

(56) References Cited

U.S. PATENT DOCUMENTS 6,445,717 B1 * 9/2002 Gibson et al. ............... 370/473
6,542,490 B1 * 4/2003 Ahmadvand et al. ....... 370/338

OTHER PUBLICATIONS

Wong et al., "Improving End-to-End Performance of TCP Using Link-Layer Retransmissions over Mobile Internetworks" 1999 IEEE, pp. 324-328.*
Jing, et al., "A Modified TCP-Newreno in a LAN/WAN With a Lossy Link" APCC/OECC'99, vol. 1, Oct. 1999.
H. Balakrishnan, et al., Improving Reliable Transport and Handoff Performance in Cellular Wireless Networks ACM Wireless Networks Journal (WINET) 1(4), Dec. 1995, pp. 1-19.
J.C. Hoe, "Improving the Start-Up Behavior of a Congestion Control Scheme for TCP" In. Proc. ACM SIGCOMM '96, Aug. 1996.
K. Fall, et al.,"Simulation-Based Comparisons of Tahoe, Reno and Sack TCP", Computer Communications Review, Jul. 1996.
E. Ayanoglu, et al. "Airmail: A Link-Layer Protocol for Wireless Network", ACM/Baltzer Wireless Networks Journal, 1. pp. 47-60, Feb. 1995.
E. Dahlman, et al. "UMTS/IMT-2000 Based on Wideband CDMA" IEEE Communication Magazine, Sep. 1998, pp. 70-80.
H. Balakrishnan, et al. "Explicits Loss Notification and Wireless Web Performance" IEEE Globecom Internet Mini-Conference, Sydney, Australia, Nov. 1998, pp. 1-12.

* cited by examiner

Primary Examiner—Phirin Sam
(74) Attorney, Agent, or Firm—Katten Muchin Rosenman LLP

(57) ABSTRACT

The present invention relates to a local retransmission scheme, which uses Transport Control Protocol (TCP) in an unreliable network. It provides reliable transmission for out-of-order TCP data packet in an unreliable link. It recovers non-congestion loss packets. It avoids incorrect adjustment of window size in TCP source end. It applies TCP local retransmission scheme, which checks together a link layer transfer sequence and a TCP source delivery sequence. With inserting timestamp of local sequence number, which is in TCP data packet and TCP acknowledgement packet, together with acknowledgement number AN, it is defined whether a data packet is lost and retransmitted. Then, with explicit retransmission ERN feedback, a TCP source false action is avoided. Therefore TCP performance of a wireless network is greatly improved.

15 Claims, 2 Drawing Sheets

TCP AWARE LOCAL RETRANSMISSIONER SCHEME FOR UNRELIABLE TRANSMISSION NETWORK

BACKGROUND OF THE INVENTION

Field of the Invention

The present invention relates to a retransmission scheme on an unreliable network. More precisely, it concerns one kind of a TCP Aware Local Retransmission scheme for Transport Control Protocol (TCP). The scheme provides reliable retransmission on an unreliable transmission link and avoids effectively the disturbance between different layers of protocol, so it improves TCP performance of the unreliable network.

With the rapid development of the Internet, it is very possible it may be the united platform of multimedia networks in the future. Therefore, it is very important to access the Internet with various network technologies, among them accessing through a mobile communication system to the Internet. ITU is now making great efforts to promote international standards of the third generation mobile communication system (IMT2000), which is expected to support mobile computing and nomadic access of the Internet. It could be said, with the development of network technology and business, there are many varieties of the lower layers of the Internet. It was unpredictable for the Internet creators that the simple assumptions of the network characteristic at the creation beginning stage cause many of its kernel protocols are not adequate to the varieties of mixed network in the future, especially for the TCP layer.

TCP is originally designed for wire link networks and has been widely used in the Internet. It provides reliable transport service for applications, such as WWW browsing, remote login (Telnet) and file transfer (FTP) etc. But many of the basic technologies, which the protocol is based on, are unreliable from the present point of view. For example, all of the packet losses are regarded as the result of congestion.

Generally speaking, TCP performance is guaranteed by the technical schemes: the congestion control and error recovery. The congestion control is based on the sliding window scheme, which has been improved repeatedly and is nearly perfect. The basic idea of error recovery is the feedback of acknowledgement, with the transfer of limited feedback information, i.e. the ACK (acknowledge) and NACK (non-acknowledge), to decide whether to retransmit the data packet. But it cannot differentiate the congestion loss and non-congestion loss by itself. This means in spite of loss being congestion or non-congestion, the TCP source inflates the window size automatically when ACK is received, and shrinks automatically when NACK received. In this way the window size is adjusted to the network volume (throughput) in order to decrease the possibility of congestion. In practice of transmission processes especially in an unreliable network such as a wireless link, because the error rate is higher at the wireless environment and non-congestion loss is severe at a bad channel, this is an incorrect trigger of congestion control. This incorrect control causes unnecessary adjustment of window size, it decreases availability of network resources. At the same time as the window is severely disturbed, TCP performance is worse. Therefore, TCP is facing many challenges in an unreliable network such as a wireless network.

On the other hand, the TCP recovery ability of losing packet is limited. There are many improving proposals for increasing the packet retransmission rate and efficiency, such as TCP-New Reno (Reference [1] J. C. Hoe, Improving the Start-Up Behavior of a Congestion Control Scheme for TCP. In proceeding ACM SIGCOMM 96, August 1996) and TCP-SACK (Reference [2] Fall and S. Floyd, Simulation-based Comparisons of Tahoe, Reno and Sack TCP, Computer Communication Review, July 1996). All of these proposals do not solve the difficult problem that is to identify the reason of losses. If using the Explicit Loss Notification (ELN) bit to solve this problem (Reference [3] Harl, Balakrishnan, and Randy H. Katz, Explicit Loss Notification and Wireless Web Performance, Globecom 98, Sydney, Australia, November 1998), it needs to update the kernel protocol of Internet, so it is infeasible.

In summary, a mixed network, especially with wireless networks, the urgent problem to be solved is to differentiate the congestion loss packet and non-congestion loss packet, and to solve the incorrect window size adjustment when non-congestion loss packet is detected.

In order to solve these problems, some local solutions have been proposed, such as based on link-layer AIRMAIL (Reference [4] E. Ayanoglu, S. Paul, T. F. Laporta, K. K. Sabnaai and R. D. Gitlin, AIRMAIL: A Link-Layer protocol for Wireless Network. ACM ACM/Baltzer Wireless Networks Journal, 1: 47–60, February 1995) and other ARQ/FEC (Automatic retransmission request. Forward error correction). With retransmission of the lost packet, they improve TCP performance, but with these pure local solutions, a large amount of overhead is added and decreases the efficiency. Reference [5] (H. Balakrishnan, S. Seshan and R. H. Katz, Improving Reliable Transport and Handoff Performance in Cellular Wireless Networks, ACM Wireless Networks, December 1995) proposes the awareness concept to solve this problem. This concept applies TCP/ACK (Transmission Control Protocol/Acknowledgement) packet in the link layer to provide the local retransmission. Because it still uses the timer for lost packet recovery, it is necessary to estimate the round-trip time accurately. Besides, with a timer in a base station, a lot of system resource is wasted. At the TCP source side to prevent ACK duplication, unnecessary timeout cannot be avoided totally.

Congestion or Retransmission causes the packets to be out-of-order. If an out-of-order packet is lost at a wireless link, it is impossible to recover it with duplicated ACK or partial ACK. A current solution is the timeout retransmission, it is needed to estimate the round-trip time accurately in a wireless link, but it is difficult to do for an unreliable wireless network.

Another solution is to use a pure link layer protocol, such as automatic retransmission request (ARQ). In this solution, the protocol can give every packet a sequence number to identify the arrival order and to use it for recovery of losses, but the overhead will cause lower efficiency.

The purpose of this invention is to design a local retransmission scheme by using TCP in an unreliable network to solve the loss of out-of-order packets, by differentiating congestion loss and non-congestion loss to avoid the false actions of a TCP source. With all these effort to get a better TCP performance in an unreliable link.

SUMMARY OF THE INVENTION

This invention uses a technical scheme with cooperation of the transport and link layer. That is TCP Aware Local Retransmission. It uses link layer transmission sequence together with TCP source delivery sequence to detect the lost data packet, then using Explicit Retransmission Notification (ERN) to avoid the false actions of a TCP source. The invention is based on the TCP aware local retransmission.

The invention is implemented as follows: a local retransmission mechanism of TCP used in unreliable network, is characterized in the following steps:

A. When the access point of an unreliable link receives a new TCP data packet from an Internet TCP source, it inserts in the packet a LAC-PDU head with a time-stamp of a first local sequence number. The packet is encapsulated to a LAC-PDU packet as "LAC-PDU head+IP head+TCP head+Data", then is delivered to the current terminal;

B. When the current terminal successfully receives a TCP data packet, it produces an acknowledgement packet (ACK1) which includes an acknowledgement number (AN), It is also inserted a LAC-PDU head with the time-stamp of a second local sequence number, i.e. the acknowledgement packet is encapsulated to a LAC-PDU acknowledgement packet and is delivered back to the access point of an unreliable link;

C. At the access point of the unreliable link, a detection of whether there is a data packet loss is made. This is according to the Acknowledgement Number (AN), the Time-stamp of the second local sequence number, both received from the acknowledgement package, and the Time-stamp of the first local sequence number, which is stored in the access point. If a lost data packet is detected, as step A procedure, updates its time-stamp of the first local sequence number in LAC-PDU head, and retransmits. When congestion loss of the data packet is impossible, which corresponds to the acknowledgement number (AN) of acknowledgement packet, the acknowledgment packet (ACK1), with explicit retransmission feedback (ERN) field marked, is delivered to the TCP source.

In step A mentioned above, when a LAC-PDU head with the time-stamp of the first local sequence number is inserted, a copy of the encapsulated LAC-PDU data packet is stored in a buffer at the same time.

The time-stamp of the first local sequence number, mentioned above, is a fixed length bit field. Along with delivered data packet increases, starting from 0 with 1 as step length its value increases sequentially.

During the whole delivery process from access point to terminal, the real delivery sequence is uniquely determined by the time-stamp value of the first local sequence number in the TCP data packet.

The time-stamp of the second local sequence number, mentioned above, is also a fixed length bit field. It records the maximum value of the time-stamp of the first local sequence number among all the successfully received TCP data packets in the current terminal.

As mentioned above at the access point of the unreliable link, a lost data packet is detected according to the acknowledgement number (AN), the time-stamp of the second local sequence number, both comes from received acknowledgement packet, and the time-stamp of first local sequence number, which is stored at the access point. Further more, detection is made for whether the data packet is still in the access point of unreliable link, which corresponds to the acknowledgement number (AN) of acknowledgement packet, if it is, a comparison between two time-stamps is made. The comparison is between the time-stamp of the first local sequence number in the data packet and the time-stamp of the second local sequence number in the acknowledgement packet. If the time-stamp of first local sequence number is less than the time-stamp of second local sequence number, the lost data packet is detected; then the time-stamp of first local sequence number at the LAC-PDU head is updated and the data packet is retransmitted. In addition, in the access point of the unreliable link, the data packets, which time-stamp of first local sequence number is less than the acknowledgement number (AN), are all deleted.

The update of the time-stamp of first local sequence number at the LAC-PDU head of the data packet, mentioned above, substitutes the time-stamp of first local sequence number with the current delivery sequence, then retransmits.

As mentioned above, in the access point of the unreliable link, the data packets, which TCP sequence number is less than the acknowledgement number, are all deleted at the following situations. They are:

a data packet, which corresponds to acknowledgement number (AN) of acknowledgement packet, is not in the access point of the unreliable link;

the time-stamp of first local sequence number is equal or greater than time-stamp of second local sequence number;

after data packet is lost, updated and retransmitted.

The explicit retransmission (ERN) feedback, mentioned above, is a one bit field. When the data packet, corresponding to the acknowledgement number (AN), is in the access point of unreliable link, the explicit retransmission (ERN) feedback bit of acknowledgement packet (ACK1), which is to be sent to TCP source, is set. When the TCP source receives an acknowledgement packet (ACK1) with explicit retransmission (ERN) feedback bit set, at the same time fast retransmission or timeout retransmission of the TCP data packet happen, which corresponds to the acknowledgement packet (ACK1), only the data packet is retransmitted without any shrink operation of the sending window.

The mentioned above time-stamp length, for first local sequence number or second local sequence number, is the maximum packet number can be buffered at the access point of unreliable link.

The mentioned above time-stamp length, for first local sequence or second local sequence number, is an eight bit field, including one carry bit for overflow.

In mentioned step A, in the LAC-PDU data packet the time-stamp of first local sequence number may be substituted by a lower layer transfer sequence number, and a corresponding relationship between the sequence number of TCP data packet and its lower layer transfer sequence number is created. With this substitution, in mentioned step B, the time-stamp of second local sequence number is the successfully received maximum transfer sequence number of lower layer in the terminal.

A TCP local retransmission scheme, used in a unreliable network, the characteristic is as follows: Method of transmitting a data packet for Mobile communication system which receives the data packet including sequence number from Internet Networks and transmits the data packet to a mobile terminal; said transmitting method comprising the steps of:

receiving a new data packet from the Internet Network;

giving a time-stamp of first local sequence number to the each received data packet;

forming the packet data to a format used in the mobile communication system with the given time-stamp of first local sequence number;

buffering the packet data with the time-stamp;

transmitting the formed packet data to the mobile terminal sending back an acknowledgement data from the mobile terminal, when the mobile terminal successfully receives the transmitted packet data, which includes an acknowledgement number and the time-stamp of second local sequence number corresponding to the received time-stamp of first local sequence number;

detecting the data packet which should be retransmitted to the mobile terminal by comparing the buffered sequence number and the time-stamp of first sequence number with the sent back acknowledgement data; and retransmitting the detected data packet.

Method of transmitting a data packet, wherein said mobile communication system includes a server, said server gives the time-stamp of first local sequence number to each received data packet, forms the packet data to the format used in the mobile communication system with the time-stamp of first local sequence number and buffers the packet data with the time stamp.

A TCP local retransmission scheme, used in an unreliable network, the characteristic is as follows: Method of receiving a data packet of a Mobile terminal in a Mobile communication system which receives the data packet including a sequence number from Internet Networks and transmits the data packet to the mobile terminal; said receiving method comprising the steps of: receiving a new data packet which is formed to a format used in the mobile communication system, the formed data packet includes a time-stamp of first local sequence number; giving a time-stamp of second local sequence number corresponding to the received time-stamp of first local sequence number;

sending back an acknowledgement data which includes an acknowledgement number and the given time-stamp of second local sequence number corresponding to the received time-stamp of first local sequence number.

The invention points to the user terminal environment, such as a mobile terminal. With an unreliable link, such as a wireless link, it is connected to a data network, such as the Internet, and a one direction TCP connection from remote server to wireless access point then to mobile terminal is established. The invention solves the non-congestion loss problem of the out-of-order TCP data packet in the unreliable link with the following ideas. The time-stamp of first local sequence number is used to identify the real transmitting sequence of the TCP data packets in the unreliable link segment. Then with the acknowledgement number (AN) of the TCP acknowledgement packet and the corresponding first and second local sequence number, the lost data packet, which corresponds to the acknowledgement number (AN), is detected. If it is lost, the data packet is retransmitted locally. At the same time, with explicit retransmission (ERN) feedback, false window action is prevented. Therefore, the invention is one kind of cooperation, between time-stamp of local sequence number and acknowledgement number (AN), to detect the lost data packet, and it is also an explicit retransmission feedback method.

The advantages of this invention are as following. Because the lost data packet is detected by the cooperation of the TCP acknowledgement packet (ACK1) and local sequence number time-stamp, and it is retransmitted locally, so without the lower layer extra overhead for control, the non-congestion loss of data packet is recovery by retransmission in time. It has characteristics of fast recovery and high efficiency. It recovers out-of-order TCP lost data packet effectively.

DETAILED DESCRIPTION

Figure 1:
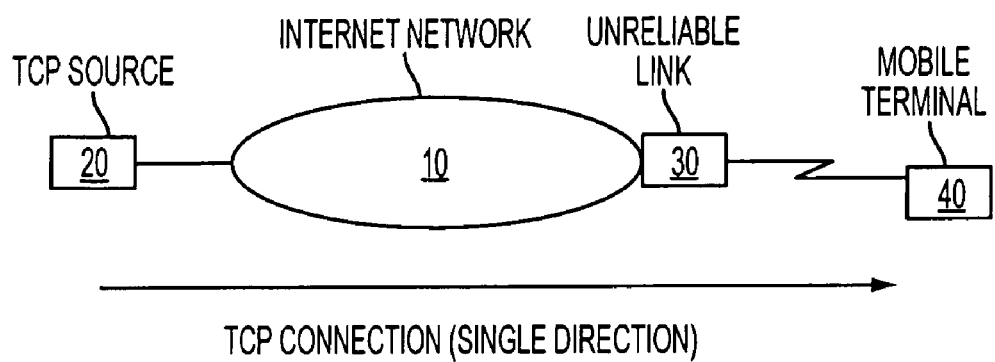
FIG. 1 is the structure diagram of one direction TCP connection in a mixed network with wireless access.

Reference to FIG. 1, a mixed network with wireless access, for example mobile communication system based on IMT2000, is shown. 10 is the international interconnection network (Internet Network), 20 is a remote server, i.e. TCP source, of Internet, 30 is a wireless (unreliable link) access point server, 40 is a mobile terminal (also a mobile computer, user terminal or user computer). The wireless access server is in a mobile communication system, which comprises a Mobile Exchanger, Radio Network Controller and base station. The wireless access server can be set up in the Mobile Exchanger, Radio Network Controller or base station. Further, functions of the wireless access server can be installed to the Mobile Exchanger, Radio Network Controller or base station without setting up the wireless access server.

Figure 2:
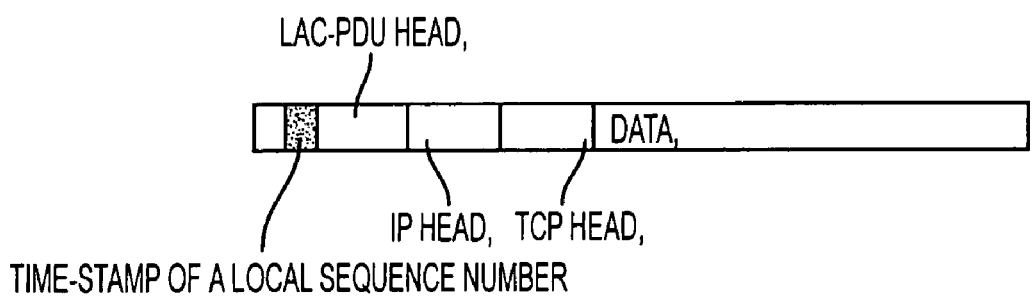
FIG. 2 is the structure diagram of data packet transmission from wireless access point to mobile terminal.

The operation of the wireless access point server 30 is as following. When it receives a new TCP data packet which comes from TCP source 20 in Internet 10, it encapsulates the data packet in a Link Access Control-Protocol Data Units (LAC-PDU). There is a fixed length bit field in the LAC-PDU head for each LAC-PDU data packet. This field is used to record the real transmission sequence number, i.e. delivery sequence, and is referred to as time-stamp of first local sequence number. The structure of the LAC-PDU data packet is shown in FIG. 2. It is "LAC-PDU head (with time-stamp of first local sequence number)+IP head+TCP head+DATA". When the time-stamp of first local sequence number is filled in, the LAC-PDU data packet is also copied to the buffer at the same time.

Figure 3:
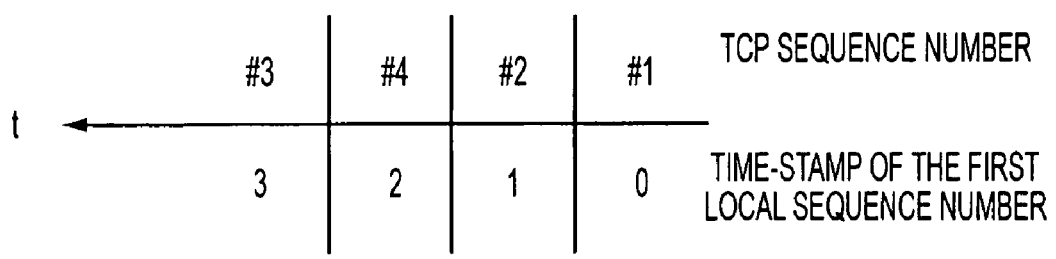
FIG. 3 is the corresponding relationship diagram between TCP sequence number and time-stamp of first local sequence number.

As data packets increase, the time-stamp value of first local sequence number is increased with the step of 1, starting from 0. Therefore each TCP data packet moves from wireless access point server (base station) 30 to mobile terminal 40, its real transmitting sequence is uniquely defined by the time-stamp of first local sequence number in LAC-PDU data packet. As shown in FIG. 3, #1, #2, #4, #3 . . . represent a TCP data packet sequence number; 0, 1, 2, 3 . . . represent time-stamp value of first local sequence number corresponding to LAC-PDU data packet #1, #2, #4, #3 . . . respectively. They are delivered along the time axis t sequentially. In the international interconnection (i.e. Internet) or large scale local area network (i.e. WAN: wide area network), there are many paths to connect between a data source and end user to realize a reliable network. This means that if the first established path has network congestion, the system may choose another path to deliver data. However, each path has a different delivery time. Thus, during a data transfer, a path change may cause out-of-order data delivery. As a result, there is a case that the wireless access server receives TCP packet data by above order of #1, #2, #4, #3 . . . .

Figure 4:
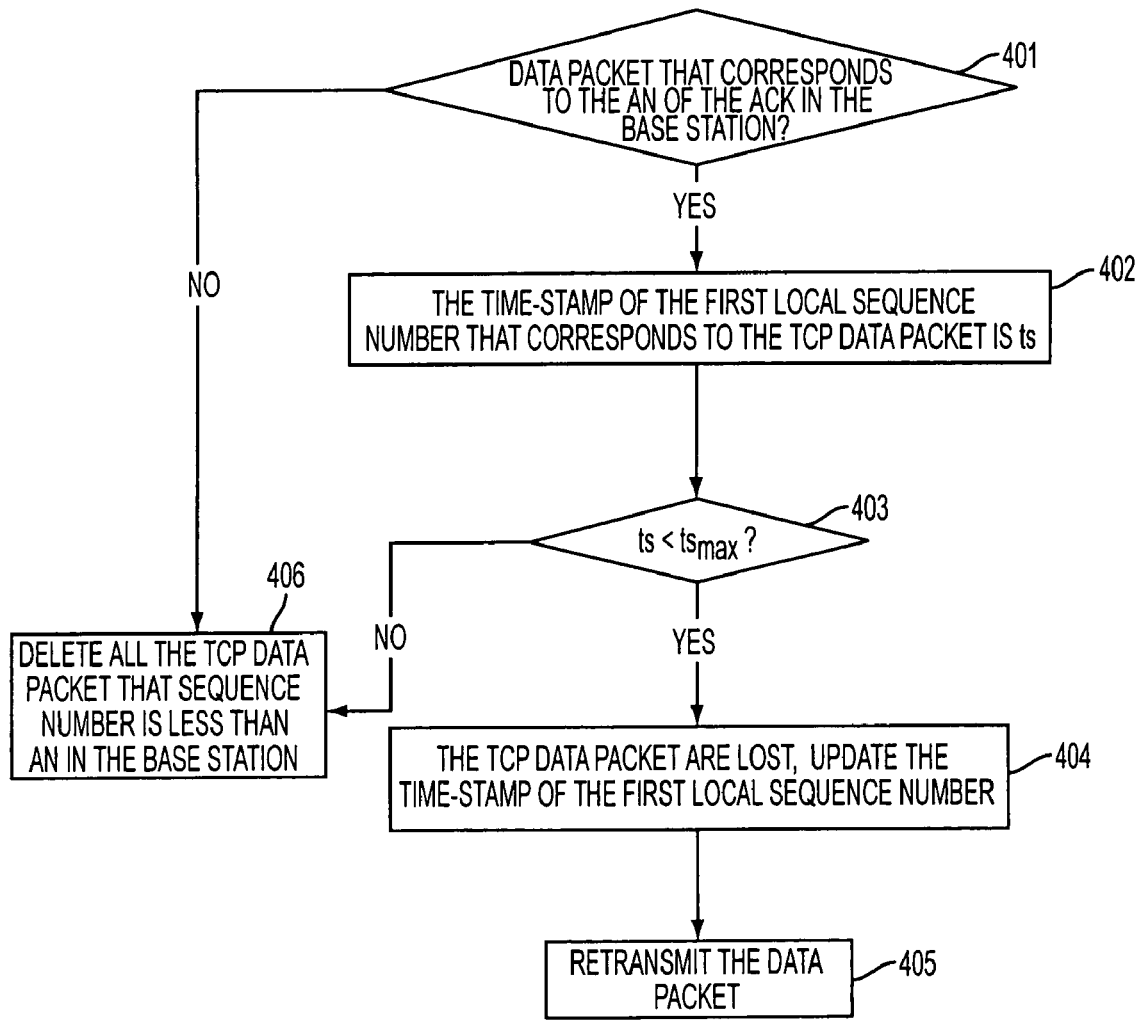
FIG. 4 is the flowchart diagram using acknowledgement packet (ACK1) to detect data packet loss.

Mobile terminal 40 produces an acknowledgement packet (ACK1) for each successfully received TCP data packet. As the TCP data packet, the acknowledgement packet is also encapsulated in a LAC-PDU. At the head of this LAC-PDU packet, there is a field for time-stamp of second local sequence number. This field records the maximum time-stamp value of first local sequence number for all successfully received TCP data packet. The current mobile terminal sends back to wireless access point server (base station) 30 acknowledgement packet (ACK1), with the time-stamp of second local sequence number and acknowledgement number. It is used to detect TCP data packet loss at the wireless link. The detection method is further described by reference to FIG. 4. Said Acknowledgment number means a number that indicates the next sequence number expected. In a backhanded manner, this also shows the TCP sequence number of the continuously received last TCP data packet; it shows TCP sequence number of the continuously received last TCP packet data plus 1.

Step 401 detects whether there is a TCP data packet, which sequence number corresponds to the acknowledgement number (AN) of acknowledgement packet (ACK1), in the buffer of wireless access point server 30 (base station). If it is, then executes step 402, otherwise step 406. Step 402 gets the time-stamp of first local sequence number in the TCP data packet, said ts. Step 403 compares ts with the time-stamp of second local sequence number, said $tS_{max}$, carried by the acknowledgement packet, to detect whether there is $ts<tS_{max}$. If it is $ts<tS_{max}$, then executes step 404, 405 and 406, otherwise step 406. When $ts<tS_{max}$, step 404 and 405 are executed. It means the TCP data packet, corresponding to acknowledged data packet sequence number (AN), is lost. Then substituting the time-stamp of first local sequence number, the TCP data packet is retransmitted. This means a new time-stamp, which represents current transmitting sequence number, substitutes the time-stamp of first local sequence number of the LAC-PDU data packet, which corresponds to the acknowledgement number (AN), then the updated LAC-PDU data packet is retransmitted. Step 406 deletes all the TCP data packet, which sequence number is less than AN, in the wireless access point server (base station) 30, under the following situations. They are: there isn't a TCP data packet, corresponding to acknowledged data packet sequence number (AN) in acknowledgement packet (ACK1), in the buffer of wireless access point server (base station) 30; there isn't $ts<tS_{max}$ and after step 404 and 405 are executed.

In the invention, an explicit retransmission (ERN) feedback (or explicit retransmission notification) bit is defined in the unused bits (as 6 bits) of acknowledgement packet (ACK1) head. When there is a TCP data packet, corresponding to the acknowledged data packet sequence number in the acknowledgement packet, in the buffer of wireless access point server (base station) 30, the explicit retransmission (ERN) feedback bit in this acknowledgement packet is set. The acknowledgement packet (ACK1), which includes the explicit retransmission (ERN) feedback and the acknowledged data packet sequence number AN, is sent to TCP source 20. When TCP source 20 receives an acknowledgement packet with explicit retransmission (ERN) feedback bit set, and the TCP data packet, corresponding to the acknowledgement packet (ACK1), is in the fast retransmission or timeout retransmission, there are no operations to shrink the window size, only the TCP data packet is retransmitted.

The time-stamp value of first or second local sequence number is fixed. Its length is the possible maximum buffered data packets for a TCP connection in the wireless access point (base station). If a TCP data packet length is 576 bytes, time-stamp of local sequence number takes value 0–127 (in general, it is enough for a TCP connection), i.e. time-stamp length of sequence number is 7 bits.

As the transmitted data packet number increases, when the time-stamp value of local sequence number exceeds its possible represented maximum value, an overflow happens and it is counted starting from 0 again. In this case, the time-stamp of local sequence number cannot represent the real data packet sequence number, so there is a carry bit in this invention. When overflow happens, the carry bit is complemented. In this way at step 403, a correct checking for greater and less relation of two time-stamps of local sequence number can be made, so an 8 bits length of time-stamp for local sequence number is suggested.

In the invention, a time-stamp of local sequence number is used to identify real sequence number of TCP data packet transmitted on an unreliable link, so any other equivalent manners can be employed, if it implements the function.

The implementation of this invention encapsulates a TCP data packet and time-stamp of local sequence number together in LAC-PDU, then transmits. In many mobile communication systems, they provide transfer function of transmitting sequence number in lower layer (data link layer). In this case the detection of data packet loss can be performed under the following conditions. They are: corresponding relationship between sequence number of TCP data packet and transmitting sequence number of its lower layer is established; the mobile terminal sends back to the base station the lower layer maximum transmitting sequence number it receives. In practice, the lower layer transmitting sequence number acts as the function of time-stamp of local sequence number.

The invention can be widely used in many reliable data communication which access data network—Internet with an unreliable link.

The key idea of this technical scheme is combining the advantages of TCP and Data Link layer, in order to decrease the data link layer overhead and provide effective reliable transmission for out-of-order packet. In this scheme, the time-stamp, which can be seen as sequence number of data link layer for the TCP section, represents the TCP section transmitting sequence in the unreliable link access point.

What is claimed is:

1. A TCP local retransmission scheme, used in an unreliable network, is comprised of:
    A. when an access point of an unreliable link receives a new TCP data packet from an Internet TCP source, said access point inserting into said data packet, an LAC-PDU head with a timestamp of a first local sequence number; said data packet encapsulated as an LAC-PDU packet comprising "LAC-PDU head+IP head+TCP head+Data";
    B. delivering said data packet to a current terminal; said current terminal producing an acknowledgement packet (ACK1) comprising an acknowledgement number (AN) when said current terminal successfully receives a TCP data packet; said current terminal also inserting to said LAC-PDU head, a time-stamp of a second local sequence number such that said acknowledgement packet is encapsulated as an LAC-PDU acknowledgement packet and is delivered back to said access point of an unreliable link;
    C. at said access point of an unreliable link, detecting whether there is data packet loss based on said time-stamp of a first local sequence number, stored in said access point, said acknowledgment number (AN) and said time-stamp of a second local sequence number, wherein both are determined from said acknowledgement packet; and
    D. if a lost data packet is detected, updating and retransmitting said time-stamp of a first local sequence number in LAC-PDU head, and when congestion loss of the data packet which corresponds to said acknowledgement number (AN) of acknowledgement packet (ACK1) is impossible, said acknowledgement packet (ACK1) along with a marked explicit retransmission feedback (ERN) field is delivered to said Internet TCP source.

2. A TCP local retransmission scheme, used in an unreliable network, as per claim 1, wherein a copy of said encapsulated LAC-PDU data packet is stored in a buffer at the time, an LAC-PDU head is inserted with said time-stamp of a first local sequence number.

3. A TCP local retransmission scheme, used in an unreliable network, as per claim 1, wherein said time-stamp of a first local sequence number is a fixed-length bit field which increases sequentially starting from zero with a step length of one as data packets are received.

4. A TCP local retransmission scheme, used in an unreliable network, as per claim 1, wherein the real delivery sequence is uniquely determined by said time-stamp of a first local sequence number of said TCP data packet during delivery from said access point to said current terminal.

5. A TCP local retransmission scheme, used in an unreliable network, as per claim 1, wherein said time-stamp of a second local sequence number is a fixed-length bit field recording the maximum value attained by said time-stamp of a first local sequence number among TCP data packets successfully received at said current terminal.

6. A TCP local retransmission scheme, used in an unreliable network, as per claim 1, wherein a lost data packet is detected based on said acknowledgement number (AN), said time-stamp of a second local sequence number, both determined from said received acknowledgement packet, and said time-stamp of a first local sequence number, which is stored at said access point; wherein said detection determines whether a data packet corresponding to said acknowledgement number (AN) of acknowledgement packet is still at said access point of unreliable link, and if so, a comparison between two time-stamps is made;
  A. said comparison is made between time-stamps of a first local sequence number in said received data packet and a second local sequence number in said acknowledgement packet;
  B. wherein if said time-stamp of a first local sequence number is less than said time-stamp of a second local sequence number, a lost data packet is detected; and
  C. said time-stamp of a first local sequence number at the LAC-PDU head is updated; said lost data packet is retransmitted; and at said access point of unreliable link, data packets for which the timestamp of a first local sequence number is less than an associated acknowledgement number (AN) are deleted.

7. A TCP local retransmission scheme, used in an unreliable network, as per claim 6, wherein said update of time-stamp of a first local sequence number at LAC-PDU data packet head substitutes said time-stamp of a first local sequence number with a current delivery sequence and then, retransmits said data packet.

8. A TCP local retransmission scheme, used in an unreliable network, as per claim 6, wherein, data packets for which a TCP sequence number is less than an associated acknowledgement number indicates that either:
  a data packet, which corresponds to said acknowledgement number (AN) of acknowledgement packet, is not in said access point of unreliable link; or
  said time-stamp of a first local sequence number is either equal to or greater than
  said time-stamp of a second local sequence number;
  after lost data packet is detected, updated, and retransmitted.

9. A TCP local retransmission scheme, used in an unreliable network, as per claim 6, wherein when said data packet corresponding to said acknowledgement number (AN) in said access point of unreliable link is detected, an explicit retransmission (ERN) feedback bit of said acknowledgement packet (ACK1), which is to be sent to a TCP source, is set; arid when said TCP source receives said acknowledgement packet (ACK1) with explicit retransmission (ERN) feedback bit set at the same time that either of, fast retransmission or timeout retransmission or said data packet corresponding to said acknowledgement packet (ACK1) occurs, said data packet is retransmitted without a corresponding shrink operation of send window of said TCP source; and wherein said explicit retransmission (ERN) feedback is a one-bit field.

10. A TCP local retransmission scheme, used in an unreliable network, as per claim 1, wherein said time-stamp length for either a first local sequence number or a second local sequence number, is the maximum number of data packets that can be buffered at said access point of unreliable link.

11. A TCP local retransmission scheme, used in an unreliable network, as per claim 1, wherein said time-stamp length for either a first local sequence or a second local sequence number is an eight-bit field; and wherein one of said eight bits is designated as a carry bit for over flow.

12. A TCP local retransmission scheme, used in an unreliable network, as per claim 1, wherein said time-stamp of a first local sequence number of said LAC-PDU data packet is substituted with a lower layer transfer sequence number; said substitution establishing a corresponding relationship between to sequence number of said TCP data packet and its lower layer transfer sequence number and wherein said time-stamp of a second local sequence number is the maximum successfully transferred lower layer sequence number in said current terminal.

13. A TCP local retransmission scheme, used in an unreliable network comprised of: transmitting a data packet for a mobile communication system; said mobile communication system receiving said data packet including sequence number from at least one Internet network and transmitting said data packet to a mobile terminal said transmission method comprising:
  receiving a data packet from said at least one Internet network;
  giving a time-stamp of a first local sequence number to each of said received data packets;
  formatting said received data packets in accordance with said mobile communication system with said given lime-stamp of a first local sequence number;
  buffering said data packet with the given timestamp;
  transmitting said formatted data packet to said mobile terminal and sending back acknowledgement data from said mobile terminal when said mobile terminal successfully receives transmitted data packet, which includes an acknowledgement number and a time-stamp of second local sequence number corresponding to said time-stamp of a first local sequence number;
  detecting whether said data packet should be retransmitted to said mobile terminal by comparing a buffered sequence number and said time-stamp of a first sequence number associated with said acknowledgement data received from said mobile terminal; and
  retransmitting said detected data packet, if determined necessary in said detecting step.

14. A TCP local retransmission scheme, used in an unreliable network, as per claim 13, wherein said mobile communication system comprising a server; said server giving said time-stamp of a first local sequence number to each of said received data packets, formatting said data packet in manner used by said mobile communication system with said given time-stamp; and buffering said data packet along with said given time stamp.

15. A TCP local retransmission scheme, used in an unreliable network, wherein a method of receiving a data packet from a mobile terminal in a mobile communication system comprises:
   a. receiving said data packet comprising a sequence number from at least one Internet network and transmitting said data packet to said mobile terminal; said reception comprising:
   b. receiving said data packet formatted in accordance with said mobile communication system, said formatted data packet comprising a time-stamp of a first local sequence number;
   c. giving a time-stamp of a second local sequence number corresponding to said received time-stamp of a first local sequence number; and
   d. sending back acknowledgment data comprising an acknowledgement number and said given time-stamp of a second local sequence number corresponding to said received time-stamp of a first local sequence number.

* * * * *